(12) United States Patent
Gugsch et al.

(10) Patent No.: US 6,357,730 B1
(45) Date of Patent: Mar. 19, 2002

(54) HYDRAULIC DAMPING TWO-CHAMBER ENGINE MOUNT

(75) Inventors: Mathias Gugsch, Strassenhaus; Andreas Pfenning, Montabaur, both of (DE)

(73) Assignee: BTR AVS Technical Centre GmbH, Hoehr-Grenehausen (DE)

( * ) Notice: Subject to any disclaimer, the term of this patent is extended or adjusted under 35 U.S.C. 154(b) by 0 days.

(21) Appl. No.: 09/577,052

(22) Filed: May 22, 2000

Related U.S. Application Data (63) Continuation of application No. PCT/EP98/07377, filed on Nov. 17, 1998.

(30) Foreign Application Priority Data

Nov. 21, 1997 (DE) .......................................... 197 51 783

(51) Int. Cl.⁷ ................................................. F16F 5/00
(52) U.S. Cl. ................................................. 267/140.15
(58) Field of Search ............................. 267/122, 140.14, 267/140.15; 248/550, 566, 636, 638, 659

(56) References Cited

U.S. PATENT DOCUMENTS 4,648,576 A * 3/1987 Matsui ........................ 248/550
4,699,099 A * 10/1987 Arai ........................ 123/192 R

* cited by examiner

Primary Examiner—Christopher P. Schwartz
Assistant Examiner—C. T. Bartz
(74) Attorney, Agent, or Firm—Herbert L. Lerner; Laurence A. Greenberg; Werner H. Stemer (57) ABSTRACT

A hydraulic damping two-chamber engine mount includes a working chamber and a compensating chamber filled with a hydraulic fluid. The chambers are separated by an intermediate plate in which an overflow passage, at least one switchable bypass passage and an isolating diaphragm are disposed. The isolating diaphragm is rotatable through the use of an actuator into a first rotatable position closing the bypass passage and a second rotatable position opening the bypass passage.

13 Claims, 7 Drawing Sheets

HYDRAULIC DAMPING TWO-CHAMBER ENGINE MOUNT

CROSS-REFERENCE TO RELATED APPLICATION

This application is a continuation of copending International Application No. PCT/EP98/07377, filed Nov. 17, 1998, which designated the United States.

BACKGROUND OF THE INVENTION

Field of the Invention

The invention relates to a hydraulic damping two-chamber engine mount including a working chamber and a compensating chamber filled with a hydraulic fluid and separated by an intermediate plate in which an overflow passage, at least one switchable bypass passage and an isolating diaphragm are disposed.

In such hydro-mounts the static load is handled by a supporting spring surrounding the working chamber. The hydraulic damping is affected by a column of fluid oscillating in the overflow passage. The task of the isolating diaphragm in hydro-mounts is to hydraulically isolate low-amplitude vibrations introduced into the system, i.e. to prevent the overflow passage from becoming active, thus eliminating all damping effects. As a result, the mount has an ideal soft response to small amplitudes. It is not until the isolating diaphragm is more or less totally deformed and/or at a stop that fluid also flows through the overflow passage and thus produces a hydraulic damping as well as enhanced stiffness. The isolating diaphragm is required to isolate small amplitudes, especially noise-relevant amplitudes, over as large a frequency range as possible.

The bypass passage is opened in critical operating situations to permit adapting the mount thereto. Opening the bypass passage achieves a reduction in the dynamic stiffness below the static stiffness, which is termed underswing or undershoot. An underswing or undershoot is particularly advantageous when the engine is idling because the mount is then able to better isolate the vibrations occurring particularly during engine idling.

When the isolating diaphragm and the bypass passage are incorporated together in a mount, they need to be tuned to each other. However, it is that tuning which results in an unsatisfactory overall result. The reason for that is that the amplitude of the vibrations upon idling is only slightly larger than that of the noise-relevant vibrations. Optimal tuning with the bypass passage opened results in a poorer response when the bypass passage is closed, i.e. with noise or an unsatisfactory functioning being the result.

SUMMARY OF THE INVENTION

It is accordingly an object of the invention to provide a hydraulic damping two-chamber engine mount, which overcomes the hereinafore-mentioned disadvantages of the heretofore-known devices of this general type and in which a bypass passage can be simply switched.

With the foregoing and other objects in view there is provided, in accordance with the invention, a hydraulic damping two-chamber engine mount, especially for a vehicle, comprising a working chamber and a compensating chamber to be filled with a hydraulic fluid; an intermediate plate separating the chambers from one another; an overflow passage disposed in the intermediate plate; at least one switchable bypass passage disposed in the intermediate plate; an isolating diaphragm disposed in the intermediate plate; and an actuator associated with the isolating diaphragm for rotating the isolating diaphragm into a first rotatable position closing the bypass passage and a second rotatable position opening the bypass passage.

With the bypass passage opened, damping and isolating is achieved practically exclusively by the bypass passage. The concept for this operating condition can be made independently of the isolating diaphragm so that the isolating diaphragm can be optimally constructed for operation with the bypass passage closed, thus permitting better adaptation to both conditions of the mount. Switching the bypass passage is achieved with a simple configuration by using the rotatable isolating diaphragm.

In accordance with another feature of the invention, there is provided a device associated with the isolating diaphragm which fixes the isolating diaphragm axially in the second rotatable position and causes the isolating diaphragm to be blocked when the bypass passage is opened so that it makes no further contribution.

In accordance with a further feature of the invention, the actuator for rotating the diaphragm may be disposed in the compensating chamber or in the working chamber. The actuator may be secured directly to the intermediate plate or to a separate mounting part. The actuator is advantageously configured as an electric motor or as a solenoid actuator.

In accordance with an added feature of the invention, the isolating diaphragm is disposed non-rotatably on a shaft of the actuator but is axially shiftable. The isolating diaphragm may be configured to be round, oval or star-shaped and flexible or rigid.

In accordance with an additional feature of the invention, depending on the configuration, the isolating diaphragm may open the bypass passage through one or more ports, the number of which advantageously corresponds to the number of the bypass passages. Upon rotation, the ports coincide with at least one of the bypass passages to thus open it. Closing it occurs by the repeat rotation of the isolating diaphragm in the opposite direction or further in the same direction.

When a round diaphragm is used, these ports are a mandatory requirement. Where an oval or star-shaped diaphragm is concerned, the locations having a larger diameter serve to close the at least one bypass passage.

In accordance with yet another feature of the invention, in order to axially fix the isolating diaphragm in place, protuberances are provided on the isolating diaphragm which cooperate with constrictions in the intermediate plate. The height of the constrictions is less than the overall height of the isolating diaphragm and the protuberances. When the isolating diaphragm is rotated, the protuberances coincide with the constrictions and fix the isolating diaphragm in place. Any movement in the direction of the longitudinal center line of the isolating diaphragm or flexing is reliably prevented in order to thus eliminate the damping action of the isolating diaphragm when the bypass passage is opened.

In accordance with a concomitant feature of the invention, the protuberances may vary in shape and may, for example, be round, half-round or bead-shaped and may be disposed on one or both sides of the isolating diaphragm.

Other features which are considered as characteristic for the invention are set forth in the appended claims.

Although the invention is illustrated and described herein as embodied in a hydraulic damping two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
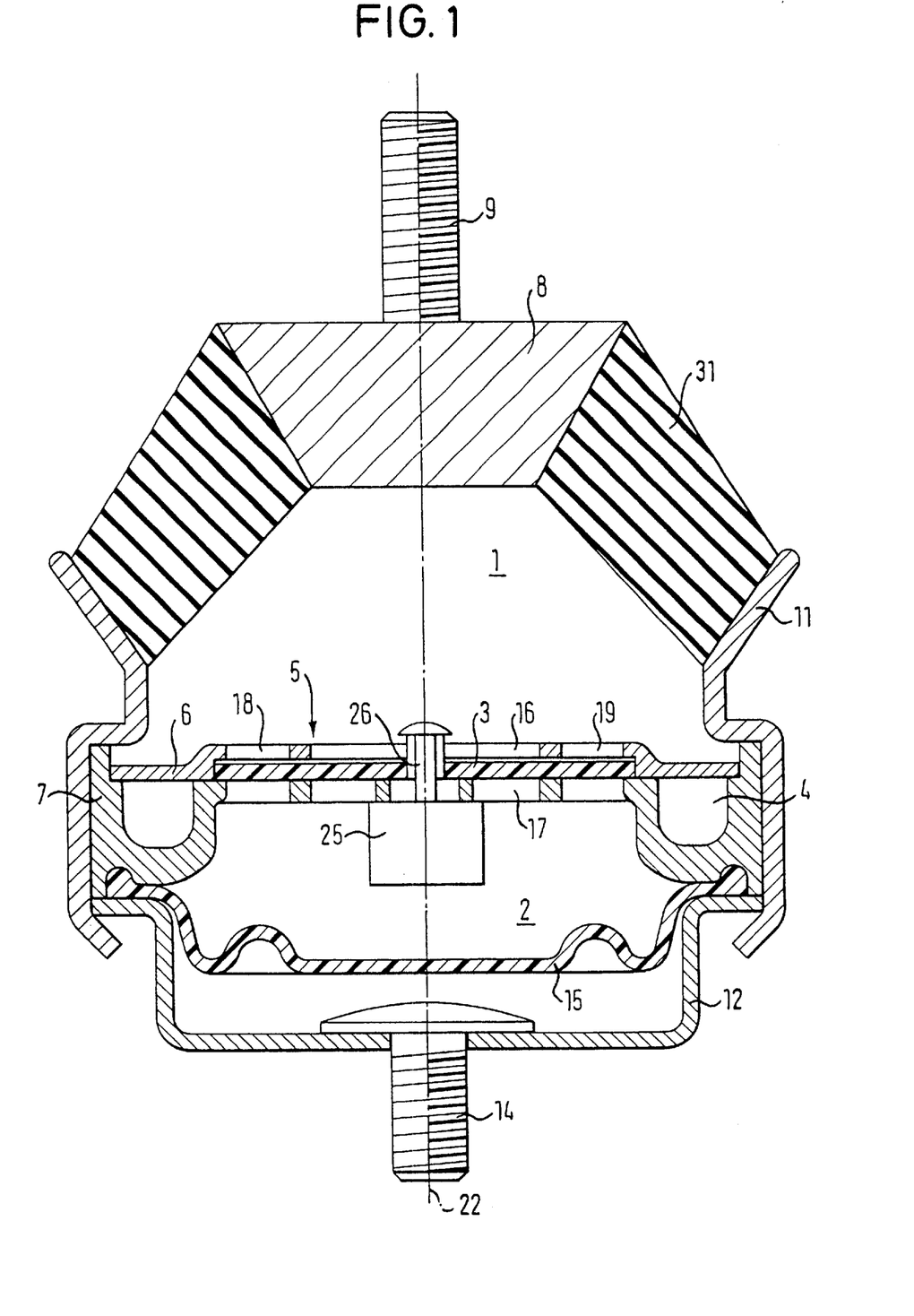
FIG. 1 is a diagrammatic, vertical-sectional view of a first embodiment of a hydraulic damping two-chamber engine mount in accordance with the invention.
Figure 2:
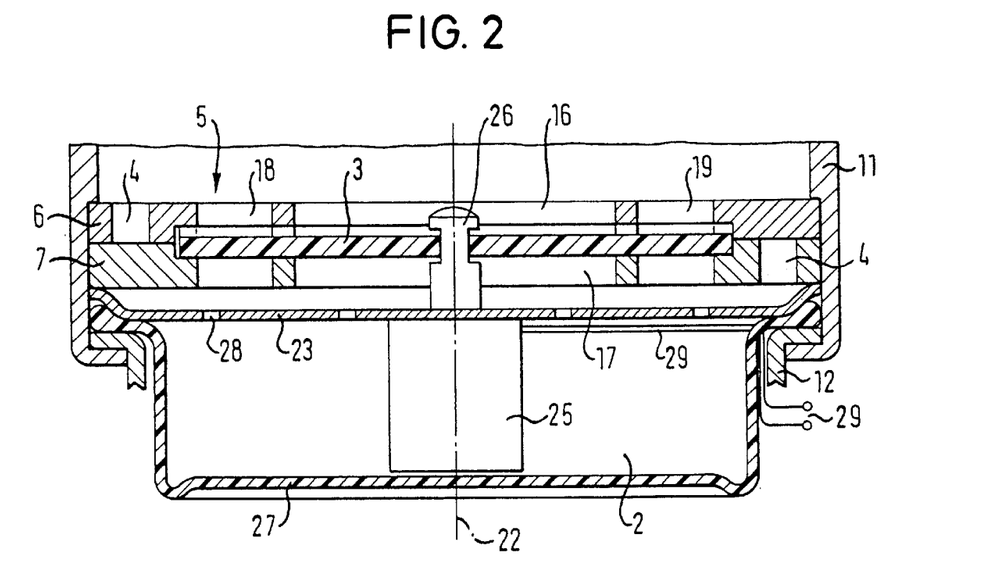
FIG. 2 is a fragmentary, vertical-sectional view of a second embodiment of the engine mount according to the invention.
Figure 3:
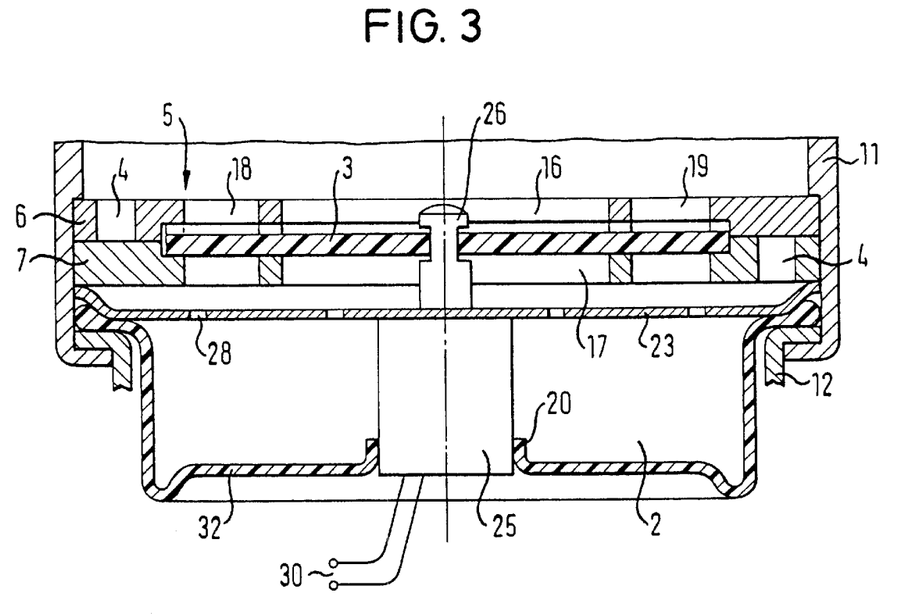
FIG. 3 is a view similar to FIG. 2 of a third embodiment of the engine mount according to the invention.

Referring now in detail to FIGS. 1 to 3 of the drawings, there are seen three different types of a hydraulic damping two-chamber engine mount in accordance with the invention, in which like components or components having a like function are identified by like reference numerals and described once only.

The two-chamber engine mount in accordance with the invention includes a working chamber 1 and a compensating chamber 2 separated by an intermediate plate 6, 7. The intermediate plate is configured in two-parts, including an underpart or upper intermediate plate 6 and a cover part or lower intermediate plate 7. An overflow passage 4 which serves to connect the two chambers 1, 2 runs spirally in the intermediate plate. An isolating diaphragm 3 is accommodated in a cage 5 disposed in the intermediate plate 6, 7.

The working chamber 1 is surrounded by an elastomeric supporting spring 31 incorporating a mounting core 8. A stud 9 protrudes from the mounting core 8. The supporting spring 31 is supported by a cylindrical metal ring 11 enclosing both of the parts 6, 7 of the intermediate plate and a housing 12. A stud 14 is fixed on the housing 12. The compensating chamber 2 is integrated in the housing 12 and closed off downwardly by an elastomeric diaphragm 15.

Both the working chamber 1 and the compensating chamber 2 are filled with a hydraulic fluid. Fluid pressure is communicated to the isolating diaphragm 3 from the two chambers 1, 2 through ports 16, 17 incorporated in the intermediate plate 6, 7.

Furthermore, two bypass passages 18, 19 are radially located within the overflow passage 4. In FIGS. 1 to 3 the bypass passages 18, 19 are closed off by the isolating diaphragm 3. A non-illustrated plunger may be fixed at the mounting core 8 in the working chamber 1 and may contact a stop for limiting amplitude.

The isolating diaphragm 3 is non-rotatably but axially shiftably connected to a shaft 26 of an actuator 25. The isolating diaphragm 3 is rotatably mounted in the cage 5 of the intermediate plate 6, 7.

The actuator 25, more particularly an electric motor, is powered through terminals 29, 30 seen in FIGS. 2 and 3, respectively. AS is evident from FIG. 1, the actuator 25 is secured to the lower intermediate plate 7 of the intermediate plate 6, 7. An additional mounting plate 23 for securing the actuator 25 is seen in FIGS. 2 and 3. The mounting plate 23 includes ports 28 to communicate the fluid to the isolating diaphragm 3. As is shown in FIG. 2, the terminals 29 pass through the compensating chamber 2 and an elastomeric diaphragm 27 which is continuous throughout. As is evident from FIG. 3, an elastomeric diaphragm 32 is sealingly applied to the actuator 25 and the terminals 30 run totally outside of the compensating chamber 2. As an alternative, an inner rim 20 of the elastomeric diaphragm 32 may also be disposed at the mounting plate 23 to thus prevent the actuator 25 from coming into contact with the hydraulic fluid. During operation the working chamber 1 is compressed, for example, resulting in hydraulic fluid overflowing through the overflow passage 4. At lower amplitudes a pressure difference between the chambers 1 and 2 is compensated for by shifting or flexing of the isolating diaphragm 3, whereas at larger amplitudes the fluid flows through the overflow passage 4 thus resulting in the pressure being equalized. Accordingly, it is the response of the isolating diaphragm 3 that is decisive at small amplitudes, whereas that of the overflow passage 4 is decisive for large amplitudes.

When the isolating diaphragm 3 is rotated through a certain angle by the actuator 25 the bypass passages 18, 19 are opened. At the same time the isolating diaphragm 3 is fixed by a device 44, to be discussed in detail below, so that any movement in the axial direction or flexing compensation is no longer possible. It is in this position that the isolating diaphragm 3 no longer has any isolating function so that the bypass passages 18, 19 are then decisive for small amplitudes.

In order to close the bypass passages 18, 19 the isolating diaphragm 3 is again rotated by the actuator 25 an d the shaft 26. The direction of rotation may be the same as that for opening or it may be a direction opposite thereto.

Figure 4:
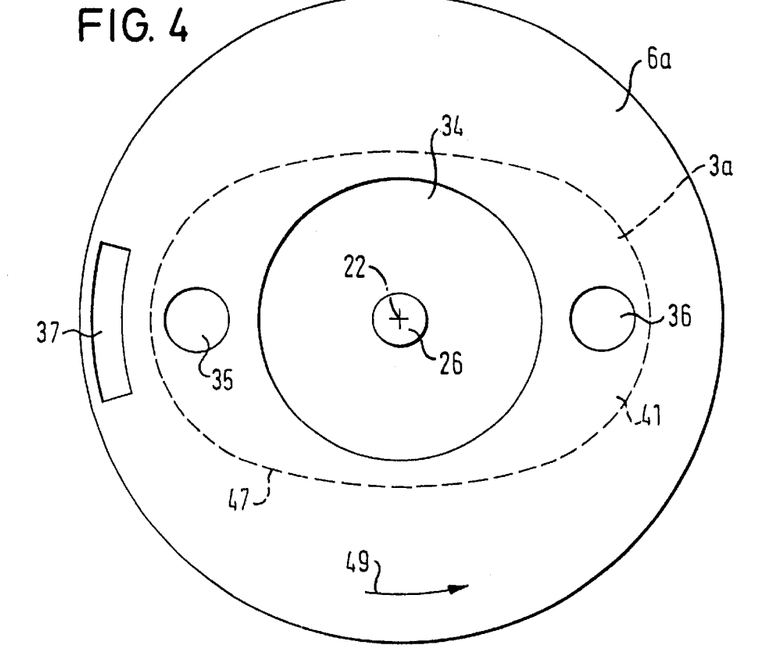
FIGS. 4 to 6 are plan views of three different embodiments of an intermediate plate and an isolating diaphragm.
Figure 5:
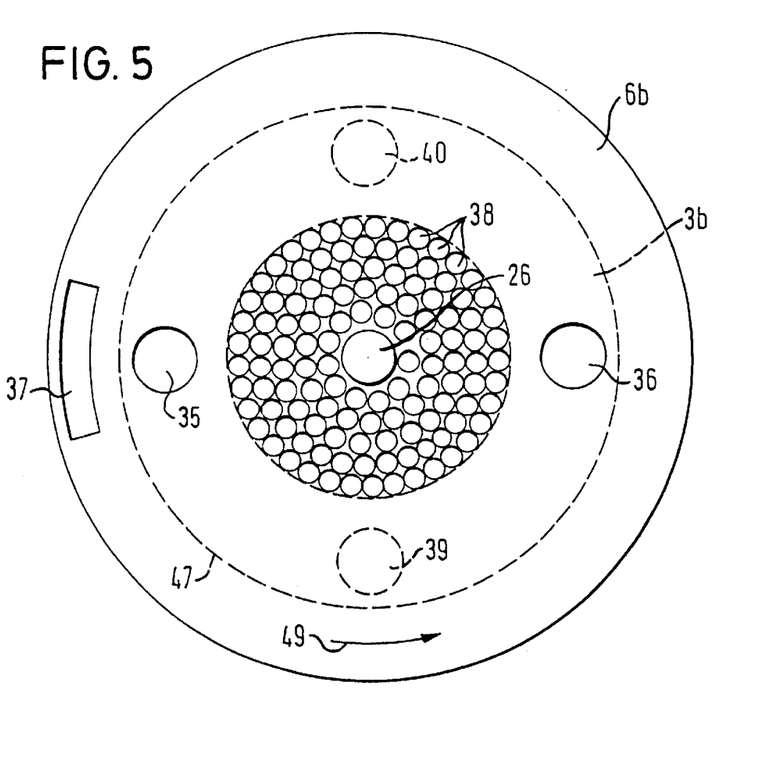
Figure 6:
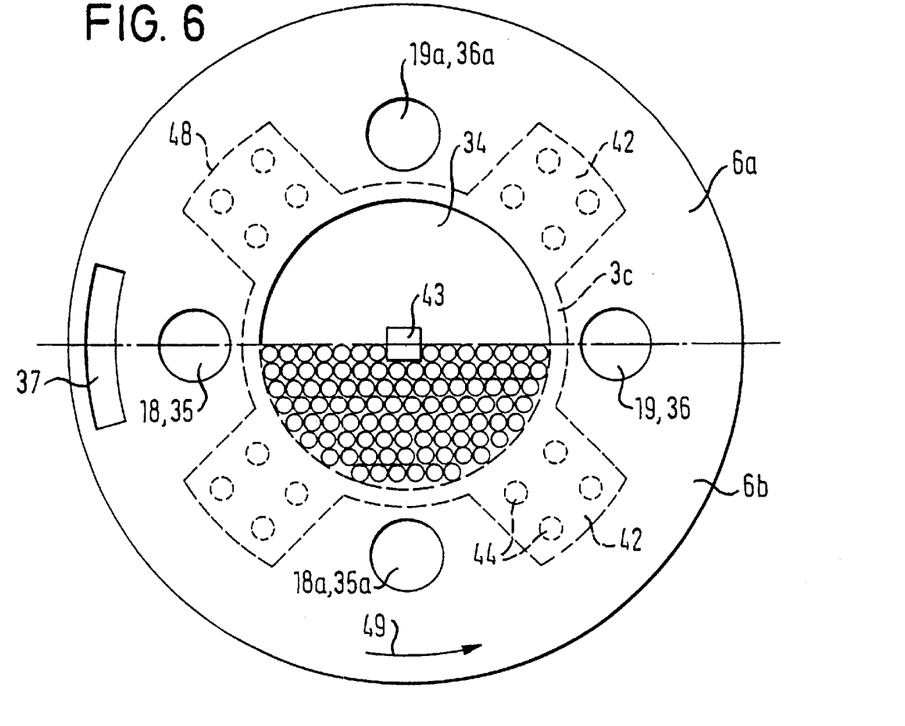

Referring now to FIGS. 4 to 6, there are seen three different variants for the upper intermediate plate 6 and the isolating diaphragm 3 as seen from above. In FIGS. 4 and 5 the bypass passages 18, 19 are closed by the isolating diaphragm 3, whereas in FIG. 6 they are opened. In FIGS. 4 and 5 the isolating diaphragm 3 is in a first rotatable position 47, whereas in FIG. 6 it is in a second rotatable position 48. The isolating diaphragm 3 is rotatable in the direction of an arrow 49 and preferably in a direction opposite thereto about a longitudinal centerline 22.

As is shown in FIG. 4, use is made of an upper intermediate plate 6a having a central circular window or recess 34. The upper intermediate plate 6a is provided with ports 35, 36 disposed on both sides of the window 34 which form openings for the bypass passages 18, 19. The upper intermediate plate 6a furthermore has an inlet 37 for the overflow passage 4.

An isolating diaphragm 3a which is shown in broken lines is configured to be substantially oval. Upon rotating about the longitudinal centerline 22, protruding ends 41 disengage from and open the bypass passages 18, 19. A new rotation closes off the bypass passages 18, 19. This isolating diaphragm 3a is a relatively rigid configuration of correspondingly hard rubber or plastics material or it may be a disk of metal or plastics material coated with a layer of rubber to cause no reduction in the stiffness of the working chamber 1 due to a flexible isolating diaphragm when the bypass passages are opened.

Referring now to FIG. 5, there is illustrated a substantially circular isolating diaphragm 3b having ports 39, 40 which upon rotation coincide with the bypass passages 18, 19 to open them as described above. An intermediate plate 6b may be provided with a plurality of small windows or recesses 38 instead of one large window 34. This configuration is preferred when the isolating diaphragm 3b that is used is flexible. Such a flexible isolating diaphragm 3b is simpler and more cost-effective to manufacture than a relatively stiff isolating diaphragm 3a as shown in FIG. 4. Providing a plurality of small windows 38 instead of a large window 34 prevents a drop in the stiffness of the working chamber 1 when using a flexible isolating diaphragm 3b.

Referring now to FIG. 6, there is seen a star-shaped isolating diaphragm 3c having four radially protruding arms 42. An intermediate plate 6a is indicated in the upper half, whereas an intermediate plate 6b is indicated in the lower half, of the figure. Advantageously, the number of arms 42 is the same as the number of bypass passages 18, 19. In the illustrated embodiment, four bypass passages 18, 18a, 19, 19a are provided with corresponding ports 35, 35a, 36, 36a. The number of these ports also corresponds to the number of the arms 42.

In the rotatable position 48 shown, the bypass passages 18, 18a, 19, 19a are opened and the isolating diaphragm 3c is axially fixed in place.

The outer diameter of the isolating diaphragm 3c is selected in such a way that the bypass passages 18, 19 can be reliably closed by the arms 42. A polygonal opening 43 in the middle of the isolating diaphragm 3c for receiving the shaft 26 of the actuator 25 is also seen in the figure.

Each arm 42 is provided with one or more devices in the form of protuberances 44 serving to fix the isolating diaphragm 3c in place. The functioning of the protuberances 44 and how they interact with the intermediate plates 6, 7 forming the cage 5 will now be explained with reference to FIGS. 7 to 11.

Referring now to FIGS. 7 to 11 there are illustrated five different embodiments of a device for fixing the isolating diaphragm 3 in place. In all of the exemplary embodiments, the isolating diaphragm 3 is provided with protuberances 44 jutting up from an upper surface. One or both intermediate plates 6, 7 include constrictions 45 and clearances 46. The constrictions 45 are dimensioned in such a way that their clearance height is lower than an overall height of the isolating diaphragm 3 and the protuberances 44. In FIGS. 7 to 10 the isolating diaphragm is shown in its first rotatable position 47, whereas in FIG. 11 it is in its second rotatable position 48.

Figure 7:
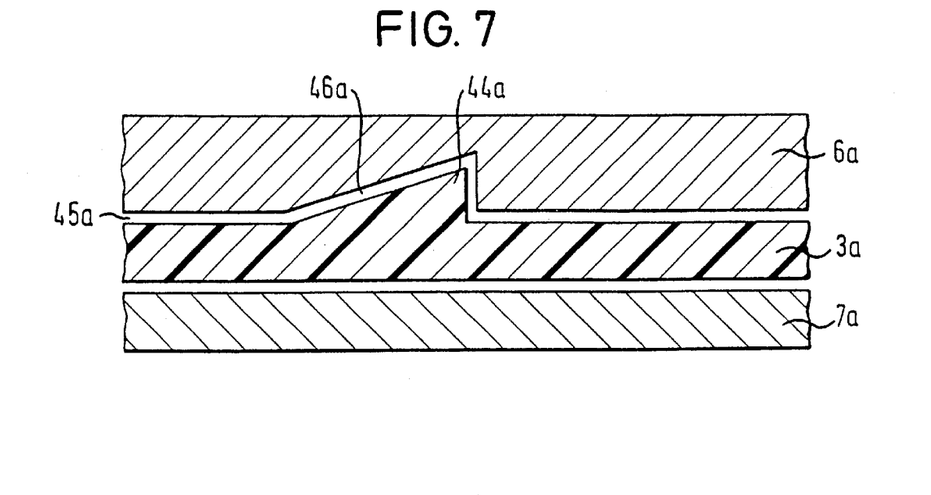
FIGS. 7 to 11 are enlarged, fragmentary, cross-sectional views of five different embodiments of devices for locating the isolating diaphragm.
Figure 8:
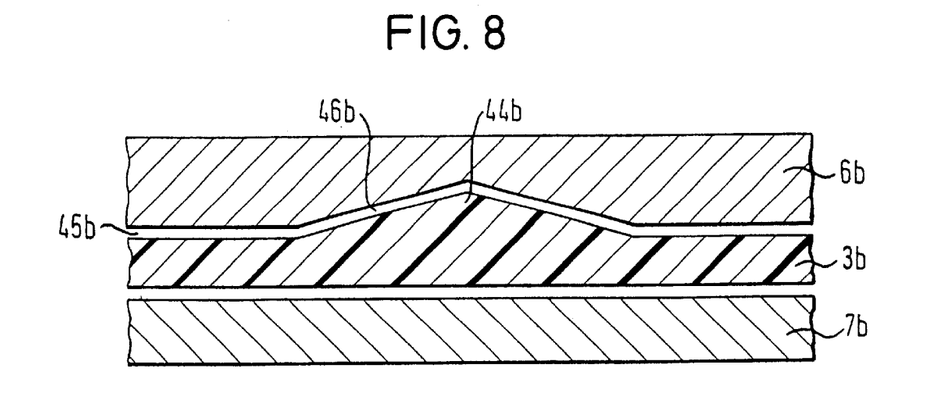
Figure 9:
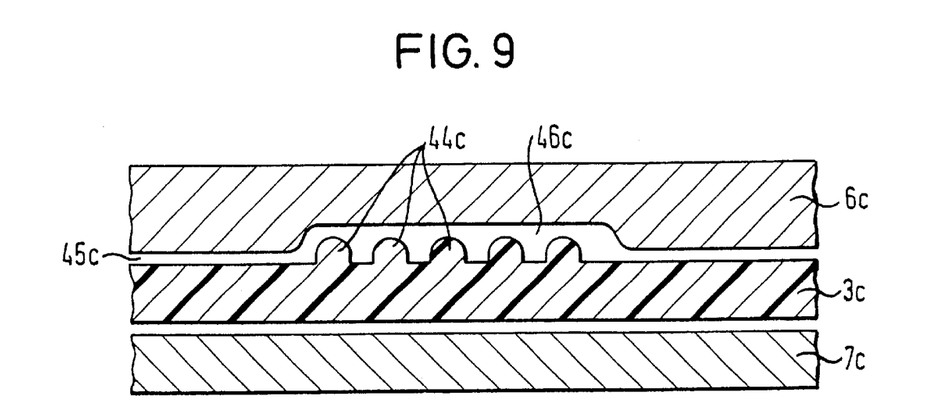

FIG. 7 shows a protuberance 44a that is roughly triangular in cross-section and the upper intermediate plate 6a has a corresponding roughly triangular clearance 46a. A constriction 45a is formed in portions in which no clearances 46a exist. FIG. 8 shows a similar embodiment in which use is made of a dual triangular protuberance 44b cooperating with a dual triangular clearance 46b. FIG. 9 shows several circular or bead-shaped protuberances 44c together with a corresponding clearance 46c and a constriction 45c.

In FIGS. 7 to 9 the isolating diaphragm 3 is not axially fixed in place and it is thus able to assume the isolating function which is provided for. The bypass passages 18, 19 in these figures are closed. Upon rotation of the isolating diaphragm 3 the protuberances 44a, 44b, 44c coincide with the constrictions 45a, 45b, 45c. The bypass passages 18, 19 are opened while the isolating diaphragm is axially fixed in place.

Figure 10:
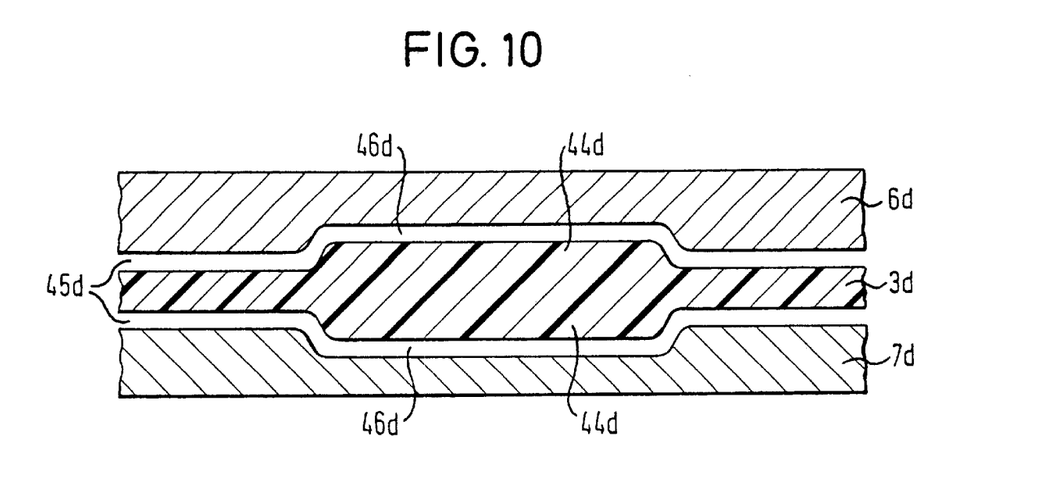
Figure 11:
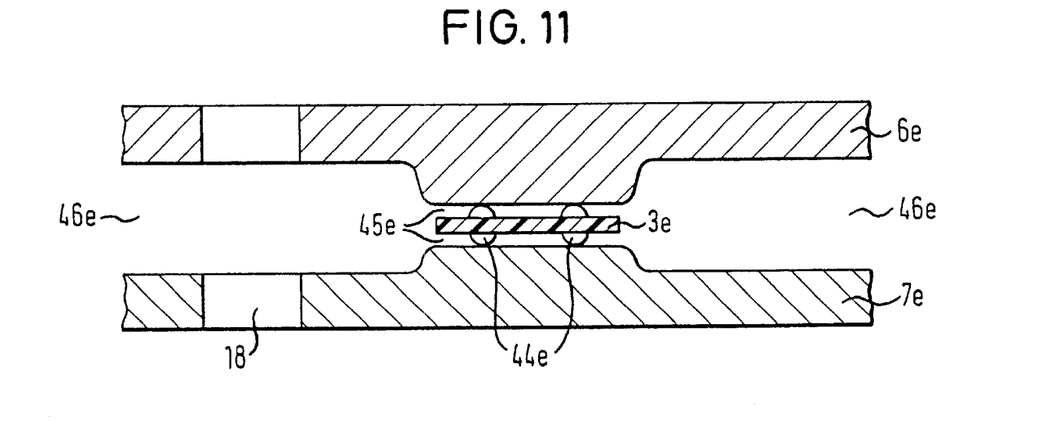

Referring now to FIGS. 10 and 11, there are seen protuberances 44d, 44e applied to both sides of an isolating diaphragm 3d, 3e, respectively. Clearances 46d, 46e are also provided correspondingly in two intermediate plates 6d, 7d, 6e, 7e. As in FIGS. 7 to 9, the isolating diaphragm 3d in FIG. 10 is not shown as being axially fixed in place. In FIG. 11 the clearances 46e coincide with constrictions 45e. Thus, in FIG. 11, the isolating diaphragm 3e is axially fixed in place and is in the second rotatable position 48 in which the bypass passages 18, 19 are opened.

Figure 12:
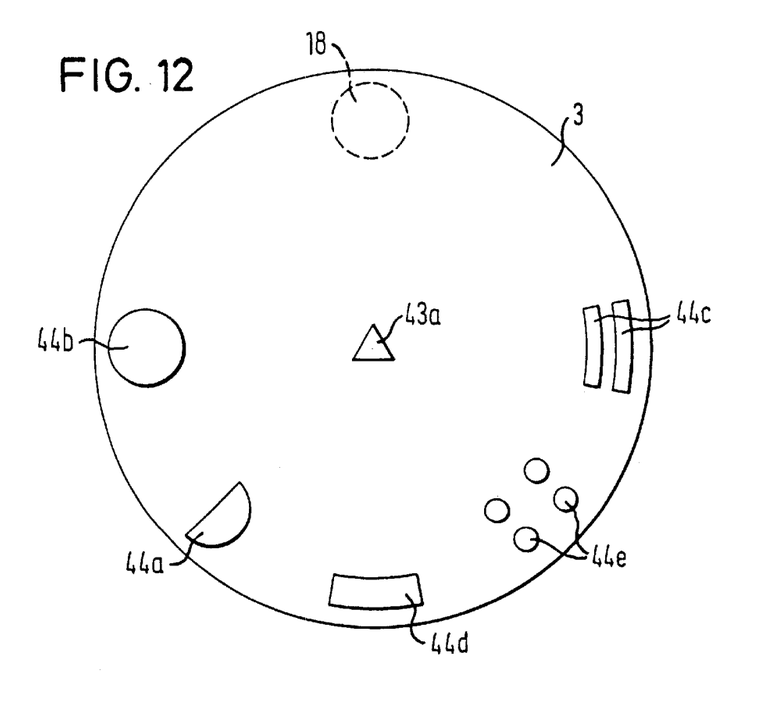
FIG. 12 is a plan view of an isolating diaphragm including various locating devices.

Referring now to FIG. 12, there is seen a top-plan view of an isolating diaphragm 3 provided with protuberances 44a to 44e as is shown in FIGS. 7 to 11. It is good practice to use only one kind of protuberance 44 for each isolating diaphragm 3. In order to provide orientation, a bypass passage 18 is also depicted by broken lines.

As viewed from above, the protuberance 44a is substantially semi-circular in shape. The protuberance 44b is composed of two protuberances 44a. The protuberances 44c are formed of several beads oriented concentrically to the isolating diaphragm 3. The protuberance 44d is formed of one such larger bead. It will readily be understood that the protuberances 44c, 44d could just as well be configured radially. The protuberances 44e correspond to those shown in FIG. 6, each having a circular cross-section.

The isolating diaphragm 3 may also be provided with a triangular or polygonal opening 43a to receive the shaft 26 of the actuator 25. As a result thereof, the isolating diaphragm 3 is fixed non-rotatably but axially shiftably on the shaft 26.

The protuberances 44a to 44e have roughly the same center-spacing relative to the isolating diaphragm 3 as the bypass passage 19 although, of course, this spacing may also be configured to be larger or smaller.

We claim:

1. A hydraulic damping two-chamber engine mount, comprising:

a working chamber and a compensating chamber to be filled with a hydraulic fluid;

an intermediate plate separating said chambers from one another;

an overflow passage disposed in said intermediate plate;

at least one switchable bypass passage disposed in said intermediate plate;

an isolating diaphragm disposed in said intermediate plate;

an actuator associated with said isolating diaphragm for rotating said isolating diaphragm into a first rotatable position closing said bypass passage and a second rotatable position opening said bypass passage;

a longitudinal centerline having a given direction; and a shaft connected to said actuator, said isolating diaphragm disposed non-rotatably on said shaft and being shiftable in said given direction.

2. The two-chamber engine mount according to claim 1, including a device associated with said isolating diaphragm for fixing said isolating diaphragm axially in said second rotatable position.

3. A hydraulic damping two-chamber engine mount, comprising:

a working chamber and a compensating chamber to be filled with a hydraulic fluid;

an intermediate plate separating said chambers from one another;

an overflow passage disposed in said intermediate plate;

at least one switchable bypass passage disposed in said intermediate plate;

an isolating diaphragm disposed in said intermediate plate; and an actuator associated with said isolating diaphragm for rotating said isolating diaphragm into a first rotatable position closing said bypass passage and a second rotatable position opening said bypass passage, said actuator being disposed in one of said chambers.

4. A hydraulic damping two-chamber engine mount, comprising:

a working chamber and a compensating chamber to be filled with a hydraulic fluid;

an intermediate plate separating said chambers from one another;

an overflow passage disposed in said intermediate plate;

at least one switchable bypass passage disposed in said intermediate plate;

an isolating diaphragm disposed in said intermediate plate; and an actuator associated with said isolating diaphragm for rotating said isolating diaphragm into a first rotatable position closing said bypass passage and a second rotatable position opening said bypass passage, said actuator being secured to said intermediate plate.

5. The two-chamber engine mount according to claim 1, including a mounting part separate from said intermediate plate, said actuator secured to said mounting part.

6. The two-chamber engine mount according to claim 1, wherein said actuator is selected from the group consisting of an electric actuator, an electromagnetic actuator and a pneumatic actuator.

7. The two-chamber engine mount according to claim 1, wherein said isolating diaphragm has at least one port.

8. The two-chamber engine mount according to claim 1, wherein said isolating diaphragm has a shape selected from the group consisting of round, oval and star-shaped.

9. A hydraulic damping two-chamber engine mount, comprising:

a working chamber and a compensating chamber to be filled with a hydraulic fluid;

an intermediate plate separating said chambers from one another;

an overflow passage disposed in said intermediate plate;

at least one switchable bypass passage disposed in said intermediate plate;

a flexible isolating diaphragm disposed in said intermediate plate; and an actuator associated with said isolating diaphragm for rotating said isolating diaphragm into a first rotatable position closing said bypass passage and a second rotatable position opening said bypass passage.

10. The two-chamber engine mount according to claim 1, wherein said isolating diaphragm is rigid.

11. A hydraulic damping two-chamber engine mount, comprising:

a working chamber and a compensating chamber to be filled with a hydraulic fluid;

an intermediate plate separating said chambers from one another having constrictions therein with a given height;

an overflow passage disposed in said intermediate plate;

at least one switchable bypass passage disposed in said intermediate plate;

an isolating diaphragm disposed in said intermediate plate;

at least one protuberance for fixing said isolating diaphragm in place, said at least one protuberance being disposed on said isolating diaphragm cooperating with said constrictions, said isolating diaphragm and protuberances having an overall height greater than said given height; and an actuator associated with said isolating diaphragm for rotating said isolating diaphragm into a first rotatable position closing said bypass passage and a second rotatable position opening said bypass passage.

12. The two-chamber engine mount according to claim 11, wherein said protuberances have a shape selected from the group consisting of round, half-round and bead-shaped.

13. The two-chamber engine mount according to claim 11, wherein said protuberances are disposed on at least one side of said isolating diaphragm.

* * * * *